Patented Feb. 5, 1929.

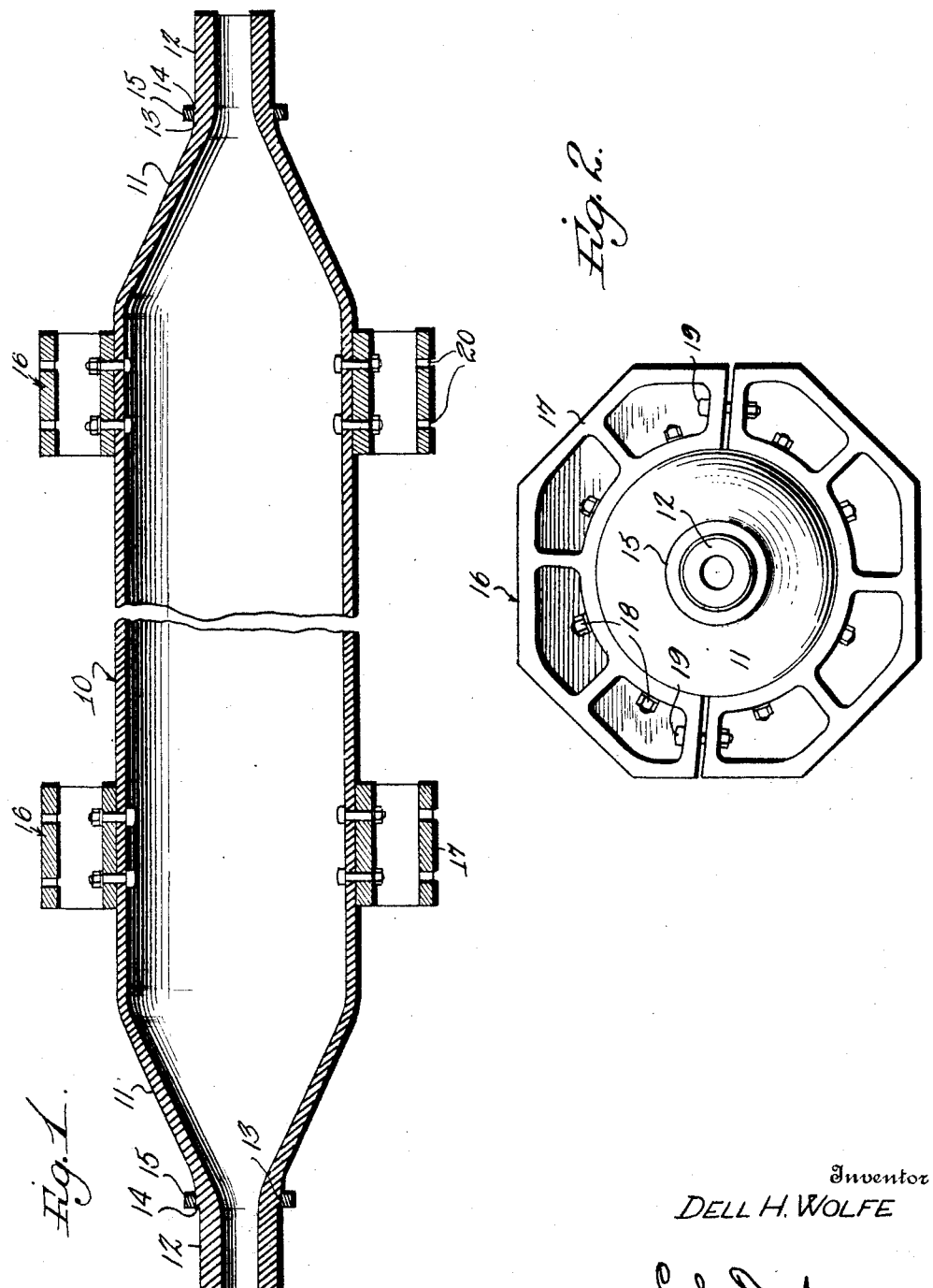

1,700,867

UNITED STATES PATENT OFFICE.

DELL H. WOLFE, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

COMBINED SHAFT AND GUDGEON.

Application filed October 27, 1927. Serial No. 229,144.

This invention relates to combined shafts and gudgeons for bull wheels and the like.

In the manufacture of shaft and gudgeon constructions for bull, band and calf wheels used in oil well operations, it is the usual practice to form the shaft of a section of tubular steel provided at its ends with separate relatively heavy gudgeons, the latter including outer cylindrical bearing engaging portions and inner radially extending annular portions adapted to be received in the ends of the tubular shaft. Bands are shrunk on the ends of the shaft to assist in maintaining the gudgeons in position, bolts being passed through the bands, the end portions of the shaft, and the adjacent portions of the gudgeons to secure these elements together. The structures referred to have been found to be wholly satisfactory in operation, but are relatively expensive to manufacture and the gudgeons thereof sometimes become loosened from the shaft.

An important object of the present invention is to provide an integral shaft and gudgeon structure which is cheaper to manufacture than the usual constructions, and wherein there is no possibility of the gudgeon becoming loosened or separated from the shaft.

A further object is to provide a structure of the character referred to wherein a section of tubular steel shafting is drawn or swaged at its ends to form the gudgeons, the latter elements being materially increased in thickness to withstand the strains to which they are subjected by virtue of the swaging operation referred to.

Other objects and advantages of the invention will become apparent during the course of the following description.

In the drawings I have shown one embodiment of the invention. In this showing,

Figure 1 is a central longitudinal sectional view through the shaft and gudgeons, together with associated hubs, and, Figure 2 is an end elevation of the same.

Referring to the drawings, the numeral 10 designates the shaft portion of the device which is formed of tubular steel or other suitable material. Outwardly of the ends of the cylindrical portion of the shaft, the latter tapers as at 11 to decrease in diameter toward its extremity, and it will be apparent that the thickness of the walls of the tapered portions increase toward their outer extremities. Integral gudgeons 12 are formed at the ends of the shaft, these gudgeons being cylindrical as shown, and having walls of substantial thickness adapted to withstand the strains to which they are subjected. A relatively thick portion 13 is arranged at the inner end of each gudgeon, forming a shoulder 14 and a ring 15 surrounds the thickened portion 13 and may be secured thereto by shrinking, welding or any other suitable means. The outer face of each ring 15 obviously is flush with the adjacent shoulder 14.

A hub indicated as a whole by the numeral 16 is adapted to surround the shaft 10 adjacent each end thereof, each hub preferably being octagonal, as shown in Figure 2. Each hub is formed of a pair of complementary sections 17 which are secured to the shaft by bolts 18, and to each other by bolts 19. The outer portions of the hub are provided with suitable openings 20 to receive bolts by means of which the spokes or arms of the wheels may be secured thereto. The hubs illustrated and described are of the usual type and form no part of the present invention.

The operation of the device is as follows:

In the manufacture of the device, a section of tubular steel stock is employed and the ends of this section are reduced by swaging in several operations to form the tapered portions 11, gudgeons 12 and shoulders 13. It will be apparent that as the diameter of the body of the device decreases, the thickness of the walls thereof will be materially increased, thus adapting the structure to withstand heavy strains at the bearing engaging portions thereof.

In assembling the structure, the hub sections 17 are bolted in position in the usual manner, after which the spokes or arms are secured at their inner ends against the faces of the hub and are bolted thereto in the usual manner. The rims are then secured to the outer ends of the spokes, as will be apparent. The gudgeons 12 are supported in bearings in the usual manner and since the body of the device is formed of a single piece of material, it will be apparent that extreme economy in operation is effected, and the danger of the gudgeon becoming loosened or separated from the shaft is wholly eliminated. The structure is particularly adapted for use in band, bull and calf wheels used in the regular oil well operations.

It is to be understood that the form of the invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. A device of the character described comprising an integral body including a central elongated tubular shaft section, and relatively thick inwardly swaged reduced gudgeons at the end portions thereof.

2. A device of the character described comprising an integral body including a central elongated tubular shaft section, inwardly swaged tapered portions extending beyond said shaft section coaxial therewith, said portions decreasing in diameter toward their outer ends, and swaged relatively thick reduced gudgeons extending beyond the ends of said tapered portions.

3. A device of the character described comprising an integral body including a central elongated tubular shaft section, inwardly swaged tapered portions extending beyond said shaft section coaxial therewith, said portions decreasing in diameter toward their outer ends, and swaged relatively thick reduced gudgeons extending beyond the ends of said tapered portions, the outer ends of the tapered portions being provided with annular shoulders slightly larger in diameter than and defining the inner extremities of said gudgeons and forming bearing engaging thrust faces.

4. A device of the character described comprising an integral body including a central elongated tubular shaft section, inwardly swaged tapered portions extending beyond said shaft section coaxial therewith, said portions decreasing in diameter toward their outer ends, and swaged relatively thick reduced gudgeons extending beyond the ends of said tapered portions, the outer ends of the tapered portions being provided with annular shoulders slightly larger in diameter than and defining the inner extremities of said gudgeons, and separate rings surrounding said body and secured thereto, the outer faces of said rings being flush with said shoulders and forming therewith bearing engaging thrust faces.

5. A device of the character described comprising an integral body including a central elongated relatively thin tubular shaft section, inwardly swaged tapered portions extening beyond said shaft section coaxial therewith, said portions decreasing in diameter and increasing in thickness toward their outer ends, and swaged relatively thick reduced gudgeons extending beyond the ends of said tapered portions, the ends of said tapered portions being substantially equal in thickness to the adjacent portions of said central section and said gudgeons respectively, the outer ends of said tapered portions being provided with annular shoulders slightly larger in diameter than and defining the inner extremities of said gudgeons, and separate rings surrounding said body and secured thereto, the outer faces of said rings being flush with said shoulders and forming therewith bearing engaging thrust faces.

In testimony whereof I affix my signature.

DELL H. WOLFE.